126,026

UNITED STATES PATENT OFFICE.

DAVID G. CONGER, OF CHICAGO, ILLINOIS.

IMPROVEMENT IN ROOFING COMPOSITIONS.

Specification forming part of Letters Patent No. 126,026, dated April 23, 1872.

*To all persons to whom these presents shall come:*

Be it known that I, DAVID G. CONGER, of Chicago, in the county of Cook and State of Illinois, have invented a new and useful Improvement in the Manufacture of Roofing Compositions; and that the following description is a full and exact specification of the same.

In manufacturing my composition the following ingredients and in the proportions stated are used, viz.: Two barrels of reduced coal-tar or of asphaltum, or of both combined, and four (4) quarts of resin, together with Akron or Newark cement, sand, and field-plaster, in the proportion of one part of the cement to four of the sand, and one of the field-plaster or gypsum.

The reduced coal-tar or asphaltum is first boiled, in any suitable vessel, for four hours, to remove all of its volatile elements, when to the boiling tar or asphaltum add the four (4) quarts of resin, previously melted, and then let the two (coal-tar and resin) boil for an additional thirty minutes. Now add to the boiling tar and resin a compound of the one part of Akron or Newark cement, four parts of sand, and one part of field-plaster, letting it continue to boil for from four to seven hours or more, until the whole becomes of the consistency of thick paste or mortar. The composition is then ready for use, and to be manufactured into sheets, slabs, or slates, by and through the medium of an apparatus for which I have secured Letters Patent of the United States dated March 19, 1872, and numbered 124,794, and as described in said patent is to be applied to one side of a sheet of felt.

The compound, made as above described, by practical experience and use has been found to be most serviceable and durable, being neither affected by the sun or frost, nor liable to crack or run.

I am well aware that all of the several ingredients herein specified have been before substantially used in roofing and in paving, and therefore I do not claim them, either separately or combined; but wish it to be distinctly understood that the invention consists only in the proportions treated and applied together, the one after another, as described.

Having thus described my invention, I shall state my claim as follows:

A compound for roofing, made of the materials, mixed together in the proportions, and as and in the manner described.

The above specification of my improvement in manufacture of roofing compositions signed by me this 30th day of March, A. D. 1872.

D. G. CONGER.

Witnesses:
EDWIN W. BROWN,
J. P. McELROY.